United States Patent Office 2,839,547
Patented June 17, 1958

2,839,547

PROCESS FOR THE PRODUCTION OF AMINOCARBOXYLIC ACIDS

Clau Berther, Chur, Switzerland, assignor to Inventa A.-G. für Forschung und Patentverwertung, Lucerne, Switzerland No Drawing. Application July 27, 1956
Serial No. 600,399

Claims priority, application Switzerland July 30, 1955

11 Claims. (Cl. 260—404)

Amino carboxylic acids can be made by various processes. In some usual processes of manufacture, amino carboxylic acids are made (1) from corresponding halogen fatty acids by reaction with ammonia or amines, (2) by the amino acid synthesis of Strecker starting from cyanohydrins, (3) by the hydrolysis of lactams, and (4) by the reduction of nitrocarboxylic acids, oximincarboxylic acids and ketoniccarboxylic acids in accordance with the process of Mignonac.

The present invention relates to a process for the manufacture of amino acids by reduction of cyanocarboxylic acids. The method is of particular interest because the starting products for the manufacture of ω-amino acids can easily be obtained from the dicarboxylic acid amides, which are readily available, by the processes of the German Patents 805,758 and 806,454 of J. Kleine. The reduction of cyanocarboxylic acids has already been investigated. P. Ruggli (Helv. 25, 35, 1942) has examined the manufacture of β-alanine from cyanoacetic acid. The best results were obtained by starting with the potassium salt of cyanoacetic acid.

It has now unexpectedly been found in accordance with the present invention that amino acids can be obtained from cyanocarboxylic acids by treating the latter with an anion exchanger before reduction. In this step of the process, the acid group is bound by the ion exchanger and its troublesome effect on the reaction is thereby prevented. The reduction can, therefore, be directly carried out in the presence of a customary hydrogenation catalyst, for example Raney nickel, which is otherwise attacked in an acid medium. Since the cyanocarboxylic acid molecules are locally bound by the ion exchanger and are, therefore, not freely movable, the formation of secondary amino compounds, such as normally occurs in the reduction of nitriles, is greatly retarded. Also reaction of the amino group formed with the carboxyl group is prevented, so that it is also possible to make amino acids which under normal conditions are converted into corresponding lactams.

Since the carboxyl groups are bound by the anion exchanger, the cyanogen group can be reduced under the usual mild reaction conditions. A further advantage of the process is that, by binding the cyanocarboxylic acid and dissolving the reaction products from the ion exchanger, purification of the product is effected.

All anion exchangers which are capable of combining with the acid group can, in principle, be used. There are, in particular, ion exchangers of the polystyrene type, such as those known under the trademarks Amberlite and Permutit which are sufficiently stable during the reduction process.

The reduction can be carried out at room temperature. It is, however, possible to work at temperatures up to 60° C., whereby the duration of the reaction is considerably reduced. The upper temperature limit is, of course, determined by the stability of the anion exchanger. A suitable temperature range is between 40° C. and 60° C.

The reduction can also be carried out under normal pressures in conjunction with the use of room temperatures or under elevated pressures in conjunction with elevated temperatures. A suitable pressure would be between 80 and 100 atmospheres.

The process can be carried out, for example, by absorbing the cyanocarboxylic acid on the ion exchanger and treating it in a solvent with hydrogen in a shaking autoclave. The exchanger charged with the cyanocarboxylic acid is mixed with the catalyst. The addition of ammonia for repressing the formation of secondary amino compounds is only permissible and desirable in the case of these exchangers, which are so basic that the acid taken up is not again freed by the ammonia. Such exchangers are, for example, those known under the trademarks Amberlite IRA-400 and IRA-410 and Permutit ESB.

After completion of the reaction, the reaction product is filtered and washed. It is important to use the catalyst in a sufficiently finely-divided form in order that it may be easily separated from the exchanger by washing on a screen.

The amino acid formed is then dissolved by strong acid, for example hydrochloric acid. The solution formed can be evaporated and the corresponding salt of the aminocarboxylic acid isolated, or the solution of the salt can be passed directly through activated ion exchanger known under the trademark Amberlite IR-4B as described in Org. Synth, vol. 32, 13, in which case the aqueous solution of the free amino acid is contained in the outflow. Also if the acid is dissolved in hydrochloric acid, it is possible to pass the solution of the hydrochloride over a cation exchanger such as, for example, that known under the trademark Amberlite IR-120. In this case the amino acid is bound by the exchanger, and can then be dissolved in ammonia. The free amino acid can then be isolated by evaporating the ammonia solution.

In accordance with a modification of the process, the cyanocarboxylic acid can be absorbed on Amberlite IR-4B and reduced by the method described. When this exchanger is used, the amino acid formed becomes directly free and can be separated from the solution by known methods. In this modified process, however, only very mild reduction methods can be used, because the exchanger is unstable.

For carrying out the process, the catalysts which are suitable for the reduction of nitriles can, in principle, be used. However, since relatively large amounts of the catalyst are necessary (30–50% calculated on the cyanocarboxylic acid) in order to obtain the necessary mixture with the exchanger, it is advantageous to use cheap catalysts such as Raney nickel. After the reaction, the catalyst can be re-used without any regeneration.

*Example 1*

85 parts of cyanoacetic acid in aqueous solution are absorbed on 1500 parts by volume of activated Amberlite IRA-410, which is then washed with ethanol. Then the cyano group of the acid is reduced with 3000 parts by volume of hydrogen and ethanol and 30 parts of Raney nickel in a suitable shaking vessel at room temperature and normal pressure until the calculated amount of hydrogen has been taken up. The reaction product is then filtered through two screens and washed with water, until the exchanger freed from catalyst remains behind on the screens. The exchanger is placed in a chromatographic absorption tube and treated with 2% hydrochloric acid until a distinct Congo acid reaction is observed at the outflow. It is then washed with water until the outflow has only a weak acid reaction. The aqueous solution of the hydrochloride obtained in this manner is then evaporated in vacuum. There are obtained 122 parts of hydrochloride of β-alanine having a melting point of 120° C. which corresponds to a yield of 97.2%.

*Example 2*

183 parts of ω-cyanopelargonic acid in aqueous alcohol solution are taken up by 1750 parts by volume of activated Amberlite IRA–410. The cyano acid is then treated with 70 parts of Raney nickel, 75 parts of ammonia and 3000 parts by volume of hydrogen and reduction is carried out in a rotary autoclave at a temperature of 45° C. and a pressure of 80 atmospheres. The reaction is complete in 2 hours. After cooling, the resin is separated from the catalyst and the solvent by two screens, washed with water and introduced into a chromatographic tube. The ω-aminocaproic acid is then dissolved from the exchanger with 2 N sulphuric acid and the resulting solution of the sulfate is passed over 700 parts by volume of activated Amberlite IR–4B. The aqueous solution obtained is evaporated in vacuum. The yield of free aminocapric acid having a melting point of 180° C. amounts to 170 parts corresponding to 90.9% of the theoretical.

*Example 3*

127 parts of ω-cyanovaleric acid are taken up on 1500 parts by volume of Amberlite IRA–400 and hydrogenated and worked up in the manner described in Example 2. 110 parts of aminocaproic acid are obtained which corresponds to a yield of 84% of the theoretical.

What is claimed is:

1. In the process of manufacturing aminocarboxylic acid, the steps comprising treating an aliphatic ω-cyanocarboxylic acid with an anion exchanger operable to block off the carboxyl groups against reactivity and to bind the resulting aminocarboxyl molecules against migration, and reducing the cyano groups into amino groups in the presence of a hydrogenation catalyst while the carboxyl groups are so blocked off and the aminocarboxyl molecules are so bound.

2. In a process of manufacturing aminocarboxylic acid, the steps as described in claim 1, wherein the anion exchanger is of the polystyrene type.

3. In a process of manufacturing aminocarboxylic acid, the steps as described in claim 1, wherein the reduction is carried out at normal pressure and room temperature.

4. In a process of manufacturing aminocarboxylic acid, the steps as described in claim 1, wherein the reduction is carried out at elevated pressure and elevated temperature.

5. In a process of manufacturing aminocarboxylic acid, the steps as described in claim 1, wherein the reduction is carried out at a temperature of 40–60° C. and a pressure of 80–100 atmospheres.

6. In a process of manufacturing aminocarboxylic acid, the steps as described in claim 1, wherein the reduction is carried out in the presence of finely-divided nickel as a hydrogenation catalyst.

7. In a process of manufacturing aminocarboxylic acid, the steps as described in claim 1, wherein the aminocarboxyl compound formed in the presence of the anion exchanger is dissolved by a strong acid.

8. In a process of manufacturing aminocarboxylic acid, the steps as described in claim 1, wherein the aminocarboxyl compound formed in the presence of the anion exchanger is dissolved by an acid of the class consisting of an aqueous solution of hydrochloric acid and an aqueous solution of sulfuric acid.

9. In a process of manufacturing aminocarboxylic acid, the steps as described in claim 8, wherein the acid solution is evaporated in vacuum.

10. In a process of manufacturing aminocarboxylic acid, the steps as described in claim 1, wherein the cyanocarboxylic acid treated is of the class consisting of cyano acetic acid, ω-cyanopelargonic acid and ω-cyanovaleric acid.

11. In a process of manufacturing aminocarboxylic acid, the steps as described in claim 1, wherein the reduction of the cyano groups takes place in the presence of water.

References Cited in the file of this patent

Ruggli: Helv. Chim Acta 25, 35 (1942).